US008465628B1

(12) United States Patent
Henderson

(10) Patent No.: US 8,465,628 B1
(45) Date of Patent: *Jun. 18, 2013

(54) FLOATING SOLAR ENERGY CONVERSION AND WATER DISTILLATION APPARATUS

(76) Inventor: Richard L. Henderson, Portland, OR (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/799,816

(22) Filed: May 3, 2010

(51) Int. Cl.
C02F 1/14 (2006.01)
B01D 1/16 (2006.01)
B01D 3/02 (2006.01)

(52) U.S. Cl.
USPC ............. 202/176; 159/4.2; 159/46; 159/48.1; 159/904; 202/234; 202/236; 203/10; 203/22; 203/27; 203/90; 203/100; 203/DIG. 1

(58) Field of Classification Search
USPC ................... 159/4.2, 46, 48.1, 904; 202/176, 202/179, 234, 236; 203/10, 22, 27, 90, 100, 203/DIG. 1
See application file for complete search history.

(56) References Cited

U.S. PATENT DOCUMENTS

| 3,655,517 | A | * | 4/1972 | Hensley et al. | 202/234 |
| 3,761,059 | A | * | 9/1973 | Rothert et al. | 366/316 |
| 3,890,205 | A | * | 6/1975 | Schnitzer | 202/236 |
| 4,172,766 | A | | 10/1979 | Laing et al. | |
| 4,187,151 | A | * | 2/1980 | Hanning | 202/185.3 |
| 4,235,221 | A | * | 11/1980 | Murphy | 126/567 |
| 4,283,913 | A | | 8/1981 | Loeb | |
| 4,324,983 | A | | 4/1982 | Humiston | |
| 4,335,576 | A | * | 6/1982 | Hopfe | 60/398 |
| 4,350,143 | A | | 9/1982 | Laing et al. | |
| 4,360,004 | A | | 11/1982 | Testolini | |
| 4,363,703 | A | * | 12/1982 | ElDifrawi et al. | 203/10 |
| 4,373,338 | A | | 2/1983 | van der Pot | |
| 4,622,949 | A | | 11/1986 | Yahalom | |
| 4,959,127 | A | * | 9/1990 | Michna | 202/177 |
| 5,306,397 | A | * | 4/1994 | Schmidt | 203/11 |
| 5,404,937 | A | | 4/1995 | Assaf et al. | |
| 5,513,494 | A | | 5/1996 | Flynn et al. | |
| 6,494,995 | B1 | * | 12/2002 | Battah | 202/234 |
| 6,820,420 | B2 | | 11/2004 | Hebert | |
| 2005/0145474 | A1 | * | 7/2005 | Lemme et al. | 202/238 |
| 2007/0289303 | A1 | | 12/2007 | Prueitt | |
| 2008/0190849 | A1 | * | 8/2008 | Vuong | 210/652 |
| 2010/0024422 | A1 | | 2/2010 | Henderson | |

* cited by examiner

Primary Examiner — Virginia Manoharan
(74) Attorney, Agent, or Firm — Mark A. Navarre

(57) ABSTRACT

A solar energy conversion and distillation apparatus floats on a body of saltwater and includes a matrix of buoyant distillation modules that produce and collect distilled water for onshore usage. The distillation modules and other buoyant structures are mutually joined within a peripheral seawall to form an atmospheric barrier, and each distillation module includes a submerged energy absorber layer to form an energy conversion chamber that confines a shallow volume of solar-heated seawater. Water vapor in the air above the confined water condenses on chilled heat exchanger conduits, and the energy absorber layer is water permeable so that confined water lost to evaporation and condensation is replenished with water from a thermal reservoir underlying the energy conversion chamber. Buoyant mistifier units in each distillation module enhance the evaporative surface area of the water vapor subject to condensation.

7 Claims, 5 Drawing Sheets

FLOATING SOLAR ENERGY CONVERSION AND WATER DISTILLATION APPARATUS

BACKGROUND OF THE INVENTION

The present invention relates to a floating solar energy conversion apparatus configured to optimize off-shore production of distilled water for on-shore usage.

BACKGROUND OF THE INVENTION

Scientists recognized long ago the possibility of converting heat energy stored in oceans and other large bodies of water into a more useful form of energy such as electricity. The well-known Ocean Thermal Energy Conversion (OTEC) process utilizes the characteristic difference in temperature (20° C.) between solar-warmed surface water and deep cold water to power a closed-cycle or open-cycle heat engine. A variant of this approach is to confine a volume of surface water (that is, a floating solar pond) and generate electricity using the temperature differential between the relatively cool, low salinity, water at the surface of the pond and the hot, high salinity, water near the bottom of the pond. See, for example, the U.S. Pat. No. 4,622,949, which discloses a floating solar pond for use on an inland body of salt water such as the Dead Sea or the Great Salt Lake.

The captured solar energy can alternatively or additionally be used to produce desalinated water, as described for example, in the U.S. Patent Application Publication 2010/0024422 to Henderson, published Feb. 4, 2010. In that system, the solar energy is used to heat a body of confined seawater, and cold seawater is circulated through an array of pipes suspended over the confined water. Water vapor in the air above the confined water condenses on the chilled pipes, and is collected for transfer to an off-shore or on-shore storage facility.

In certain regions of the world that border large bodies of saltwater, an ample supply of fresh water is desperately needed for human consumption and agriculture. While commercial desalinization systems can satisfy a minor part of this need, they require a substantial and reliable source of electrical energy to operate and a skilled workforce to maintain them. A floating solar energy conversion system such as described in the aforementioned U.S. Patent Application Publication 2010/0024422 can address both electrical energy and fresh water production, but the populace in the subject regions need an efficient way of producing large quantities of fresh water more than they need electricity. Accordingly, what is needed is a floating solar energy conversion system configured to optimize off-shore production of distilled water for on-shore usage.

SUMMARY OF THE INVENTION

The present invention is directed to an improved solar energy conversion and storage apparatus that floats on a body of saltwater and includes a matrix of buoyant distillation modules that produce and collect distilled water for transfer to an off-shore or on-shore storage facility. The distillation modules and other buoyant structures are mutually joined within a peripheral seawall to form an atmospheric barrier, and each distillation module confines a shallow volume of solar-heated seawater under the atmospheric barrier from which the distilled water is produced.

The distillation modules each include a domed solar collector mounted on a buoyant base, a submerged energy absorber layer affixed to the base to define an energy conversion chamber in which the shallow volume of solar-heated seawater is confined, and a framework of mostly submerged heat exchanger conduits through which a heat exchange fluid is circulated. Water vapor within the domed solar collector condenses on the un-submerged heat exchanger conduits, and is collected for transfer to the storage facility. The energy absorber layer is light impermeable but water permeable so that confined water lost to evaporation and condensation is replenished with water from a thermal reservoir underlying the energy conversion chambers. Production of desalinated water by this mechanism is optimized within each distillation module by one or more buoyant mistifier units that float on the confined water and atomize a portion of the confined water to maximize the evaporative surface area of the water vapor within the domed solar collectors.

DESCRIPTION OF THE PREFERRED EMBODIMENT

Figure 1A:
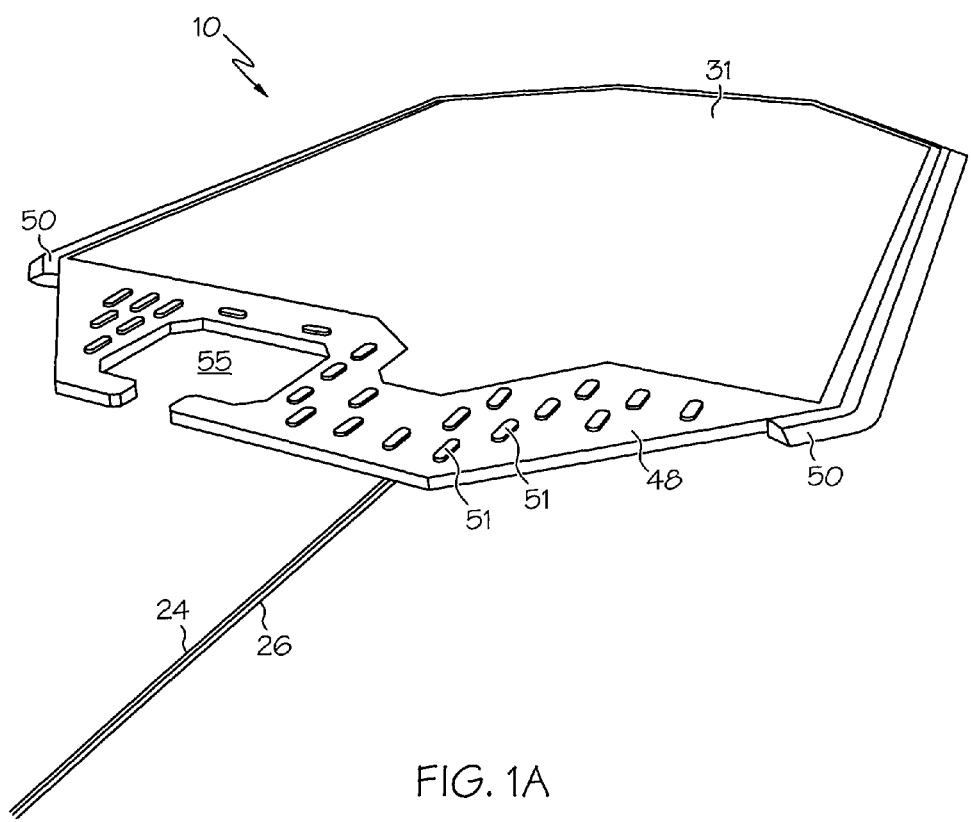
FIG. 1A is an overall isometric diagram of the apparatus of this invention as seen from above.
Figure 1B:
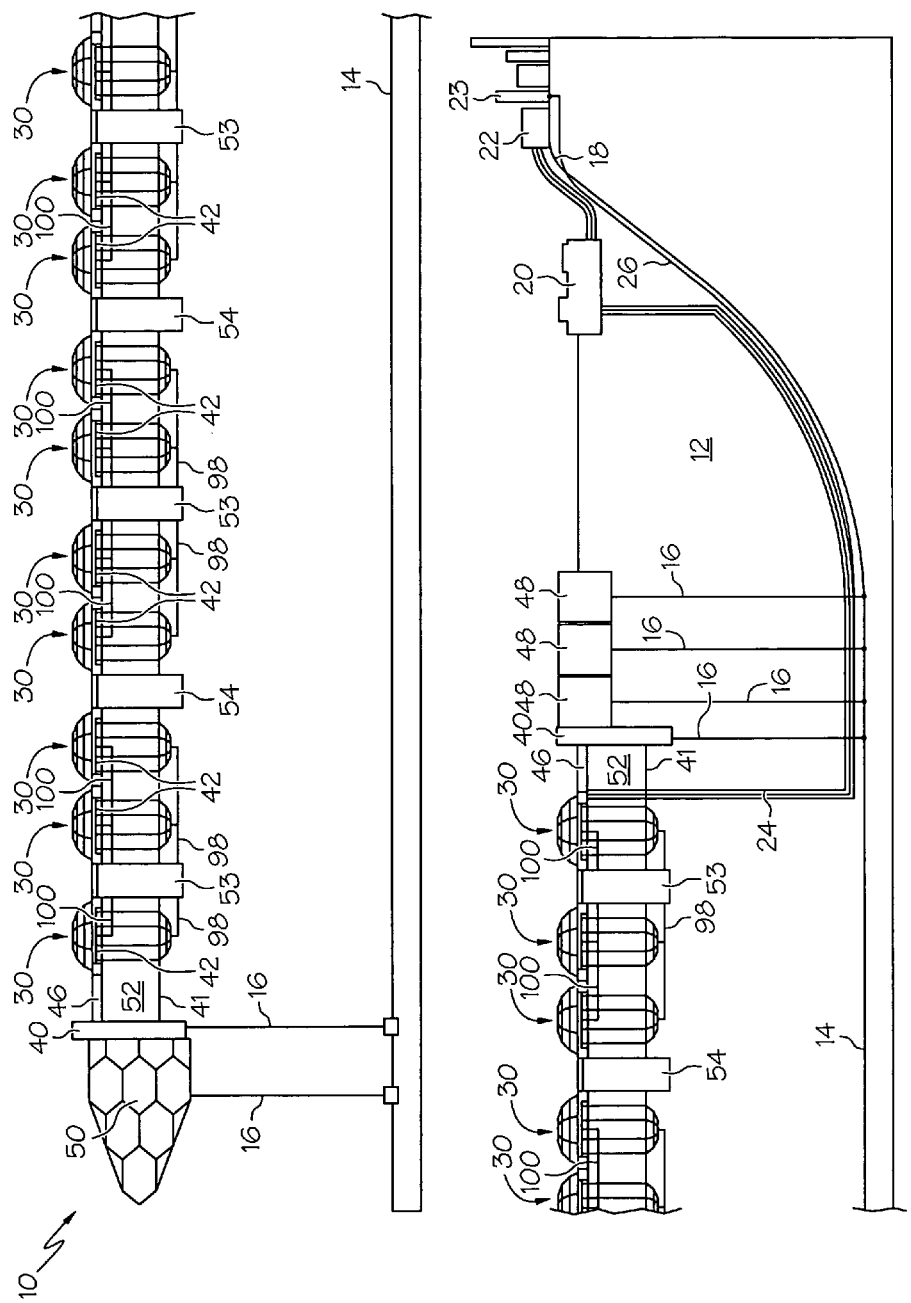
FIG. 1B is a side view of the overall apparatus of FIG. 1A, including an energy conversion chamber, a thermal reservoir, and a distributed array of distillation modules, pump utility shafts, and drain shafts.

Referring to FIGS. 1A and 1B, the reference numeral 10 generally designates a floating solar energy conversion apparatus according to this invention, configured for off-shore use in a body of seawater 12. The apparatus 10 is anchored to the seafloor 14 by an array of peripheral mooring cables 16. For example, the apparatus 10 may be floating in 100 m of seawater, several thousand meters from shore 18. The shore and near-shore facilities include a floating reservoir 20 for storing desalinated water, a pumping facility 22 for transferring desalinated water from reservoir 20 to a water distribution system, and an electricity transfer facility 23 for supplying electrical power to the apparatus 10 from a commercial electrical distribution system. Desalinated water produced by the apparatus 10 is transferred to reservoir 20 by a fresh water pipeline 24 extending downward to the seafloor 14, and following the contour of seafloor 14 as shown. And electricity is supplied to the apparatus 10 by a set of electrical cables 26 bundled with the pipeline 24.

The apparatus 10 is laterally bounded by a buoyant peripheral seawall 40, and includes an array of buoyant distillation modules 30, pump utility shafts 53, and precipitate drain shafts 54 that are mutually joined within the peripheral seawall 40 to from an atmospheric barrier 31. Other buoyant structures joined to the distillation modules 30, pump utility shafts 53, and precipitate drain shafts 54 include one or more roadways 46, and docks 48. The docks 48 are disposed on the leeward side of the apparatus 10, and the other portions of seawall 40 are fitted with a sloped wave energy absorber 50 that protects the apparatus 10 from wave-related damage. Additionally, the seawall 40 may be designed to allow for drainage of seawater from very large waves that break over the seawall 40. As illustrated in FIG. 1A, the docks 48 support various structures 51 (storage building and living quarters, for example), and are configured to provide a sheltered docking area 55 for vessels. The various buoyant structures within seawall 40 are preferably inter-connected by peripheral double-tongue-in-groove plates to form the atmospheric barrier 31.

As explained below, the distillation modules 30 produce and collect fresh water for transfer to the floating reservoir 20. The pump utility shafts 53 are described below in reference to FIG. 3, and the precipitate drain shafts 54 serve as portals to the seawater 12 beneath apparatus 10 for disposing of surface water from rain and wave action and accessing heat exchangers and other submerged components of the apparatus 10 for inspection, maintenance or repair.

Figure 2:
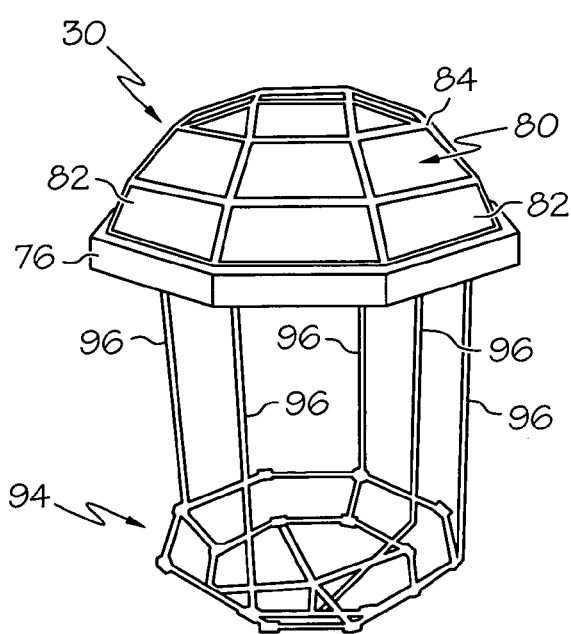
FIG. 2 is an isometric diagram of a distillation module of FIG. 1B.
Figure 3:
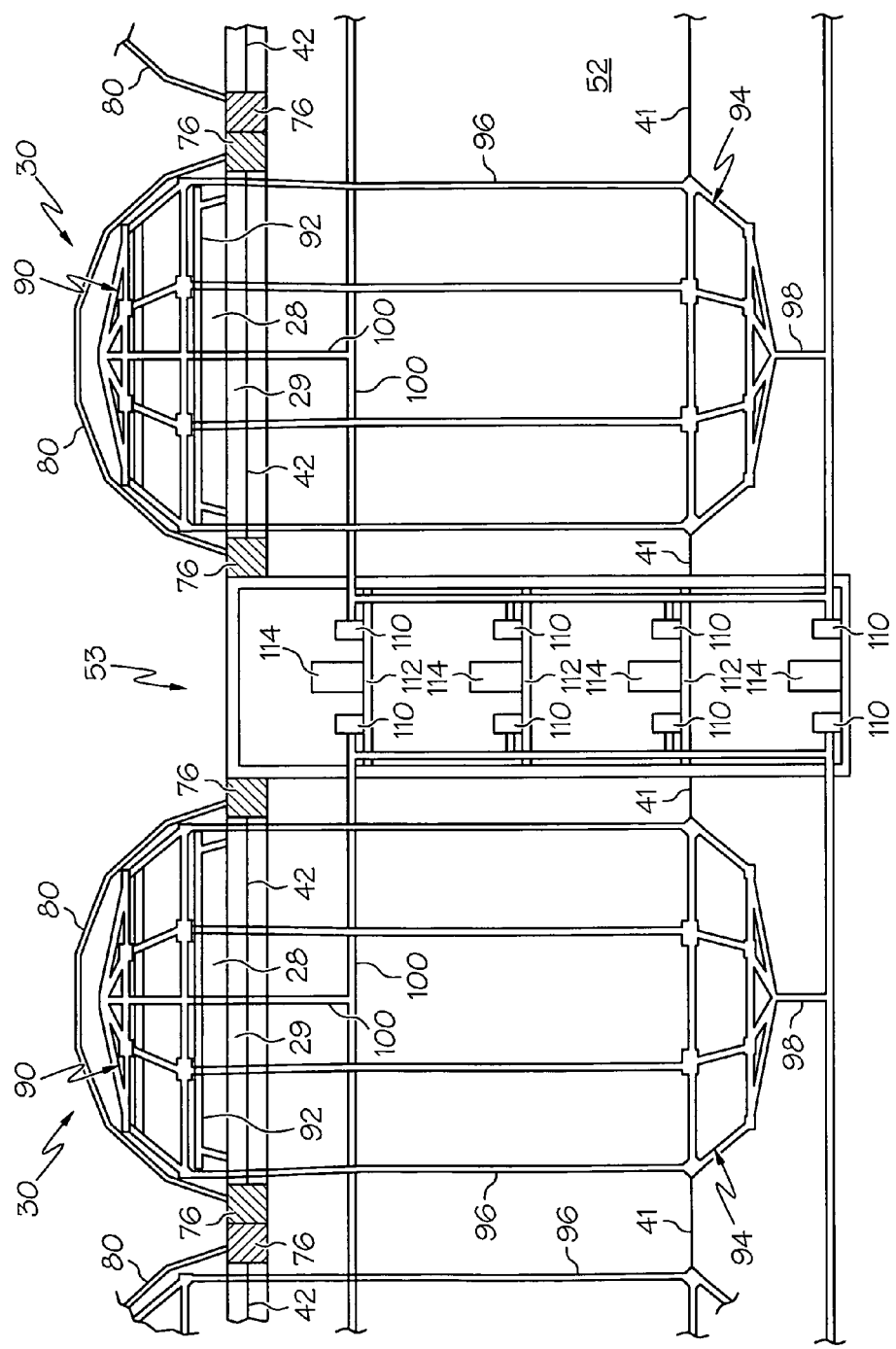
FIG. 3 is a side view of two distillation modules and an intermediate pump utility shaft from FIG. 1B.

Referring to FIGS. 2-3, each distillation module 30 includes a domed solar collector 80 mounted on a buoyant octagonal base 76, a submerged energy absorber layer 42 affixed to the base 76 to define an energy conversion chamber 28 in which a shallow volume of solar-heated seawater 29 is confined, and a framework of conduits defining upper and lower heat exchangers 90 and 94. As seen in FIG. 1B, the peripheral seawall 40 extends well below the buoyant bases 76 of the distillation modules 30, and defines a thermal reservoir 52 that is open to ambient seawater 12 beneath the apparatus 10. In each distillation module 30, the upper heat exchanger 90 is supported above the confined water 29 in energy conversion chamber 28, while the lower heat exchanger 94 is submerged in the thermal reservoir 52. The submerged seawall 40 isolates the lower heat exchangers 94 (as well as the pump utility shafts 53 and the precipitate drain shafts 54) from underwater currents, and a network of horizontally extensive cables 41 laterally support the lower heat exchangers 94, the pump utility shafts 53, and the precipitate drain shafts 54 with respect to the seawall 40.

A series of vertical conduits 96 interconnect the upper and lower heat exchangers 90 and 94, and heat exchange fluid (double distilled water, for example) within the heat exchangers 90 and 94 and pipes 96 is circulated by a pump 110 housed in a nearby pump utility shaft 53 to chill the conduits of upper heat changer 90. Through-fittings are provided in the energy absorber layer 42 to accommodate the vertical pipes 96. Water vapor within the domed solar collector 80 condenses on the exposed surfaces of the upper heat exchanger 90, and is collected by a set of troughs 92 for transfer to the storage reservoir 20. The energy absorber layer 42 is submerged at a depth of approximately 0.33 meters below sea level, and is preferably constructed of a multi-layer polypropylene fabric that is light impermeable but seawater permeable so that water lost to evaporation and condensation within the domed solar collectors 80 is readily replenished by seawater from the thermal reservoir 52. In addition, excess dissolved minerals in the confined water 29 can pass through the energy absorber layer 42 into the thermal reservoir 52.

The distillation modules 30 have two primary functions: solar energy collection, and water distillation/collection. The solar energy primarily heats the shallow volume of water 29 confined in each energy conversion chamber 28, and the water distillation process adds heat to the water in thermal reservoir 52. And as described below in reference to FIGS. 4-5, a set of buoyant mistifier units 60 within each of the distillation modules 30 atomize a portion of the confined water 29 to maximize the evaporative surface area of the water vapor within the domed solar collectors 80 to optimize the water distillation function.

Referring to FIGS. 2-3, the domed solar collector 80 of each distillation module 30 comprises sealed sections of double-paned glass 82 (preferably filled with argon or some other suitable IR-insulating gas) supported by a hemispherical frame of non-corrosive tubing 84 extending upward from the octagonal base 76. The sealed sections of glass 82 inhibit infrared heat loss, and in latitudes 40 or more degrees North or South of the equator, some of the glass sections may include a reflective coating to optimize solar energy input when the angle of solar incidence is low.

The hemispherical frame 84 also supports upper and lower heat exchangers 90 and 94, the vertical conduits 96, and the distillate collection troughs 92. Essentially, solar energy collected through the domed solar collector 80 heats the water in energy conversion chamber 28 so that the air within the domed solar collector 80 has a high concentration of water vapor, and a large volume of fresh water is collected due to condensation on the upper heat exchanger 90. The heat exchange fluid circulating through the upper heat exchanger 90 in vapor chamber 86 chills the surface temperature of the conduits comprising upper heat exchanger 90 to a temperature below the dew point of the vapor-laden air, and the latent heat of condensation is transferred from the water vapor to the heat transfer fluid in upper heat exchanger 90 as the water vapor condenses on the heat exchanger conduits. At the same time, the condensate coalesces and drips off the heat exchanger conduits into the underlying troughs 92, which channel the condensate and direct it to a series of on-board reservoirs (not shown) for transfer to the floating reservoir 20. Preferably, the heat exchanger conduits are constructed of glass, and the surface of the non-submerged conduits may be frosted to optimize their surface area, and thereby enhance condensate production. As the heat exchange fluid passes downward through the vertical pipes 96 and into the lower heat exchanger 94, the absorbed heat of condensation is released to the water in thermal reservoir 52. Transferring heat to the thermal reservoir 52 in this way is useful because the warmed seawater in thermal reservoir 52 insulates the confined water 29 in the energy conversion chamber 28 from ambient seawater 12, and provides a source of pre-warmed seawater to replace water in the energy conversion chamber 28 that is lost to evaporation and condensation.

The domed solar collectors 80 are each equipped with an exhaust fan (not shown) and one-way inlet valve (not shown). The exhaust fan is periodically activated to exchange the air within the domed solar collectors 80 with fresh atmospheric air to release non-condensing gasses and thereby maximize condensation and the associated heat transfer. Also, the domed solar collectors 80 are each equipped with one or more atmospheric vents (not show) that open when the barometric pressure is below the vapor pressure within the domed solar collectors 80, as can occur under certain atmospheric conditions.

As shown in FIG. 3, the pump utility shafts 53 house motor-driven pumps 110 for circulating the heat exchange fluid through heat exchangers 90, 94 and pipes 96 in nearby distillation modules 30. The pumps 110 are disposed on peripheral shelves 112 at different levels of the pump utility shaft 53, and in the illustration of FIG. 3, a flexible return pipe 98 connected to the lower heat exchanger 94 is coupled to the inlet of a pump 110 at the lowest level. The outlet of the pump 110 is coupled to the upper heat exchanger 90 via the flexible supply pipe 100. The pump utility shaft 53 may also house motor-driven air compressors 114 to provide compressed air to the roadways 46 and docks 48 for maintaining their floatation elevation.

Figure 4:
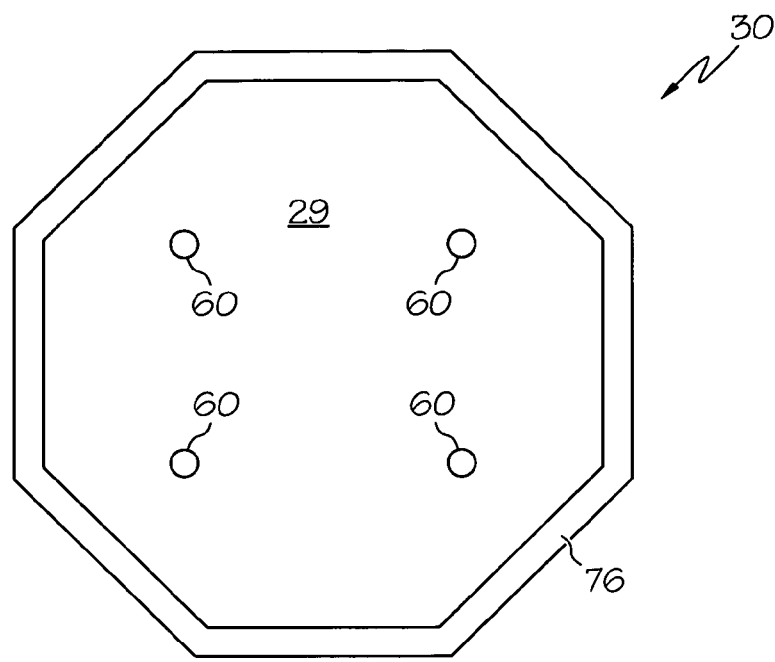
FIG. 4 is a diagram depicting a distributed array of mistifier units within a distillation module.

As mentioned above, the distillation/condensation function in each of the domed solar collectors 80 is optimized by the buoyant mistifier units 60 that float on the confined water 29 and atomize water within the domed solar collectors 80. In the illustration of FIG. 4, four mistifier units 60 are disposed within each domed solar collector 80, but it will be appreciated that more or fewer mistifier units 60 may be used. In any event, the mistifier units 60 greatly increase the evaporative surface area of the water vapor, and hence the concentration of water vapor, within the domed solar collectors 80, and thereby significantly enhance the production of condensate.

Figure 5:
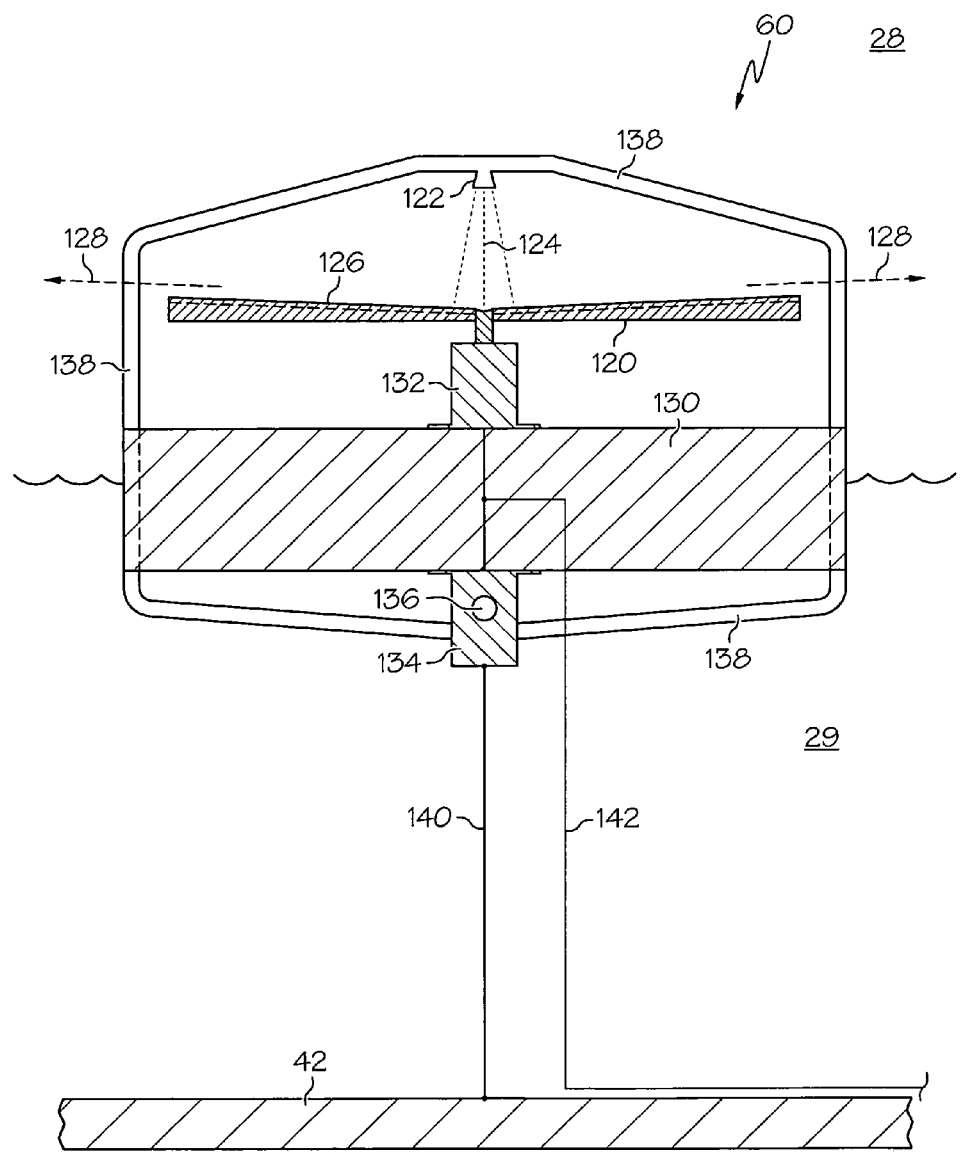
FIG. 5 is a diagram of the mistifier unit of FIG. 4.

FIG. 5 depicts a representative mistifier unit 60 floating in the confined water 29 of Energy Conversion Chamber 28 within a distillation module 30. The depicted mistifier unit 60 includes a spinning disk 120 and an overhead nozzle 122 that directs a stream of water 124 at low pressure onto the center of disk 120. The upper surface of disk 120 has a series of radial grooves 126, and is slightly concave as shown so that the stream of water 124 is directed laterally outward in a shallow arc as indicated by the arrows 128. The energy imparted to the stream of water 124 by the rotating disk 120 effectively atomizes the water, and much of the mist evaporates into the air within the energy conversion chamber 28. Preferably, the mist is projected just a few inches above the surface of the confined water 29 so as to prevent accumulation of sea minerals on the glass sections 82 of the domed solar collector 80.

Structurally, each mistifier unit 60 includes a buoyant base 130, a motor 132 mounted on the upper surface of the base 130 for rotating the disk 120, and a submersible pump 134 mounted on the lower surface of base 130 for delivering a supply of confined water to the overhead nozzle 122. The pump 134 ingests confined water through the inlet 136, and delivers it to nozzle 122 through a set of pipes 138 anchored to the periphery of base 130. A tether 140 couples the housing of pump 134 to the underlying Energy Absorber layer 42 to keep the mistifier unit 60 properly positioned relative to the domed solar collector 30, and an electrical cable 142 provides electricity for operating the motor 132 and pump 134.

In summary, the apparatus of the present invention efficiently addresses the urgent need to produce large quantities of fresh water in an off-shore installation. While described with respect to the illustrated embodiments, it is recognized that numerous modifications and variations in addition to those mentioned herein will occur to those skilled in the art. For example, electricity for operating the apparatus 10 may be generated by equipment onboard the apparatus 10, and so on. Accordingly, it is intended that the invention not be limited to the disclosed embodiment, but that it have the full scope permitted by the language of the following claims.

The invention claimed is:

1. A solar energy water distillation apparatus floating on a body of seawater, comprising:
    a buoyant peripheral seawall;
    an array of buoyant structures mutually joined within said buoyant peripheral seawall to form an atmospheric barrier, the buoyant structures including a distributed array of distillation modules for producing and collecting distilled water for on-shore usage, each such distillation module including a buoyant base, a domed solar collector mounted on said buoyant base, a submerged energy absorber layer affixed to said buoyant base to define a chamber, a shallow volume of solar-heated seawater confined in said chamber, a network of chilled heat exchanger conduits disposed in said chamber on which water vapor in the air above the confined water condenses, and a set of troughs for collecting the condensate for removal and delivery to a condensate storage vessel; and
    at least one buoyant mistifier unit in each distillation module for enhancing an evaporative surface area of the water vapor therein and increasing condensate formation on said chilled heat exchanger conduits, where said mistifier unit floats on said shallow volume of solar-heated seawater, and said mistifier unit includes a spinning disk and seawater delivery means for directing a stream of the solar-heated seawater onto said spinning disk, where said spinning disk of said mistifier unit is disposed above and substantially parallel to an upper surface of said solar-heated seawater and said seawater delivery means includes a nozzle disposed above said spinning disk through which said stream of said solar-heated seawater is directed onto said spinning disk.

2. The solar energy water distillation apparatus of claim 1, where:
    said peripheral seawall extends below the buoyant bases of said distillation modules to define a thermal reservoir beneath said chamber; and
    said energy absorber layer is light impermeable but water permeable so that seawater from the thermal reservoir passes through the energy absorber layer and into said chamber to replace water lost to evaporation and condensation within said chamber.

3. The solar energy water distillation apparatus of claim 1, where:
    said peripheral seawall extends below the buoyant bases of said distillation modules to define a thermal reservoir beneath said chambers; and
    a network of submerged heat exchanger conduits is connected to each network of chilled heat exchanger conduits for transferring a heat of condensation of said water vapor to seawater in said thermal reservoir.

4. The solar energy water distillation apparatus of claim 1, where:
    multiple mistifier units are disposed in each distillation module.

5. The solar energy water distillation apparatus of claim 1, where:
    said at least one buoyant mistifier unit is tethered to said submerged energy absorber layer.

6. A solar energy water distillation apparatus floating on a body of seawater, comprising:
    an array of buoyant structures mutually joined within a buoyant peripheral seawall to form an atmospheric barrier, the buoyant structures including a distributed array of distillation modules for producing and collecting distilled water for on-shore usage, each such distillation module including a domed solar collector mounted on a buoyant base, a submerged energy absorber layer affixed to said buoyant base to define a chamber in which a shallow volume of solar-heated seawater is confined, a network of chilled heat exchanger conduits disposed in said chamber on which water vapor in the air above the confined water condenses, and a set of troughs for collecting the condensate for removal and delivery to a condensate storage vessel; and
    one or more buoyant mistifier units floating on the solar-heated seawater confined in the chamber of each distillation module for atomizing a portion of said solar-heated seawater to enhance an evaporative surface area of the water vapor therein and increase condensate formation on said chilled heat exchanger conduits, where said mistifier units each include a spinning disk disposed above and substantially parallel to a surface of said solar-heated seawater and a nozzle disposed above said spinning disk through which a stream of said solar-heated seawater is directed onto an upper surface of said spinning disk, and where said spinning disk is slightly concave so that the solar-heated seawater directed onto the upper surface of said disk is directed laterally outward in a shallow upward arc.

7. A solar energy water distillation apparatus floating on a body of seawater, comprising:

an array of buoyant structures mutually joined within a buoyant peripheral seawall to form an atmospheric barrier, the buoyant structures including a distributed array of distillation modules for producing and collecting distilled water for on-shore usage, each such distillation module including a domed solar collector mounted on a buoyant base, a submerged energy absorber layer affixed to said buoyant base to define a chamber in which a shallow volume of solar-heated seawater is confined, a network of chilled heat exchanger conduits disposed in said chamber on which water vapor in the air above the confined water condenses, and a set of troughs for collecting the condensate for removal and delivery to a condensate storage vessel; and one or more buoyant mistifier units floating on the solar-heated seawater confined in the chamber of each distillation module for atomizing a portion of said solar-heated seawater to enhance an evaporative surface area of the water vapor therein and increase condensate formation on said chilled heat exchanger conduits, where said mistifier units each include a spinning disk disposed above and substantially parallel to a surface of said solar-heated seawater and a nozzle disposed above said spinning disk through which a stream of said solar-heated seawater is directed onto an upper surface of said spinning disk, and where said mistifier units include a buoyant platform, a motor mounted on said buoyant platform for driving said spinning disk, and a pump mounted on said buoyant platform for delivering said solar-heated seawater to said nozzle via a set of vertical pipes.

* * * * *